United States Patent
Lo et al.

(10) Patent No.: US 11,061,318 B2
(45) Date of Patent: Jul. 13, 2021

(54) LITHOGRAPHY MODEL CALIBRATION

(71) Applicant: Taiwan Semiconductor Manufacturing Co., Ltd., Hsinchu (TW)

(72) Inventors: Shih-Hsiang Lo, Hsinchu (TW); Hsu-Ting Huang, Hsinchu (TW); Ru-Gun Liu, Hsinchu County (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 16/748,551

(22) Filed: Jan. 21, 2020

(65) Prior Publication Data
US 2020/0278604 A1  Sep. 3, 2020

Related U.S. Application Data

(60) Provisional application No. 62/812,157, filed on Feb. 28, 2019.

(51) Int. Cl.
G06F 111/06 (2020.01)
G06F 111/10 (2020.01)
(Continued)

(52) U.S. Cl.
CPC .......... *G03F 1/36* (2013.01); *G03F 1/70* (2013.01); *G03F 7/705* (2013.01);
(Continued)

(58) Field of Classification Search
USPC .......................................... 716/54
See application file for complete search history.

(56) References Cited

U.S. PATENT DOCUMENTS 8,796,666 B1  8/2014  Huang et al.
8,850,366 B2  9/2014  Liu et al.
(Continued)

FOREIGN PATENT DOCUMENTS

TW   201629905 A   8/2016
TW   I614570 B     2/2018
(Continued)

OTHER PUBLICATIONS

Vasek, Jim et al., "SEM-Contour Based Mask Modeling," Proc. of SPIE vol. 6924, 11 pgs.
(Continued)

*Primary Examiner* — Bryce M Aisaka
(74) *Attorney, Agent, or Firm* — Haynes and Boone, LLP (57) ABSTRACT

Provided is a method for fabricating a semiconductor device including generating an ideal image using measured contour data and fitted conventional model terms. The method further includes using the fitted conventional model terms and a mask layout to provide a conventional model aerial image. In some embodiments, the method further includes generating a plurality of mask raster images using the mask layout, where the plurality of mask raster images is generated for each measurement site of the measured contour data. In various embodiments, the method also include training a neural network to mimic the ideal image, where the generated ideal image provides a target output of the neural network, and where the conventional model aerial image and the plurality of mask raster images provide inputs to the neural network.

20 Claims, 7 Drawing Sheets

(51) Int. Cl.
*G03F 1/36* (2012.01)
*G03F 1/70* (2012.01)
*H01L 21/027* (2006.01)
*G03F 7/20* (2006.01)

(52) U.S. Cl.
CPC ...... *G03F 7/70441* (2013.01); *G03F 7/70516* (2013.01); *G03F 7/70666* (2013.01); *H01L 21/0274* (2013.01); *G06F 2111/06* (2020.01); *G06F 2111/10* (2020.01)

(56) References Cited

U.S. PATENT DOCUMENTS

| | | | |
|---|---|---|---|
| 8,906,595 B2 | 12/2014 | Liu et al. | |
| 8,954,899 B2 | 2/2015 | Wu et al. | |
| 9,093,530 B2 | 4/2015 | Huang et al. | |
| 9,367,655 B2 | 6/2016 | Shih et al. | |
| 9,390,217 B2 | 7/2016 | Wang et al. | |
| 9,548,303 B2 | 1/2017 | Lee et al. | |
| 9,865,542 B2 | 1/2018 | Liaw et al. | |
| 9,870,443 B2 | 1/2018 | Huang et al. | |
| 2015/0186557 A1 | 7/2015 | Ye et al. | |
| 2016/0313651 A1* | 10/2016 | Middlebrooks | G06F 30/367 |
| 2019/0206041 A1* | 7/2019 | Fang | G06T 7/001 |

FOREIGN PATENT DOCUMENTS

| | | |
|---|---|---|
| TW | 201901285 A | 1/2019 |
| WO | 2018217225 A1 | 11/2018 |

OTHER PUBLICATIONS

Franz X Zach, "Neural Network based approach to resist modeling and OPC," Proc of SPIE vol. 5377, 11 pgs.

Watanabe, Yuki, "Accurate Lithography simulation model based on convolutional neural networks," Proc. of SPIE, vol. 10147, 10 pgs.

Mack, Chris, "Improved Methods for Lithography Model Calibration," Proc. of SPIE, vol. 6607, 9 pgs.

* cited by examiner

LITHOGRAPHY MODEL CALIBRATION

CROSS-REFERENCE TO RELATED APPLICATION

This application claims the benefit of U.S. Provisional Application No. 62/812,157, filed Feb. 28, 2019, the entirety of which is incorporated by reference herein.

BACKGROUND

The electronics industry has experienced an ever-increasing demand for smaller and faster electronic devices which are simultaneously able to support a greater number of increasingly complex and sophisticated functions. Accordingly, there is a continuing trend in the semiconductor industry to manufacture low-cost, high-performance, and low-power integrated circuits (ICs). Thus far these goals have been achieved in large part by scaling down semiconductor IC dimensions (e.g., minimum feature size) and thereby improving production efficiency and lowering associated costs. However, such scaling has also introduced increased complexity to the semiconductor manufacturing process. Thus, the realization of continued advances in semiconductor ICs and devices calls for similar advances in semiconductor manufacturing processes and technology.

As merely one example, scaling down of IC dimensions has been achieved by extending the usable resolution of a given lithography generation by the use of one or more resolution enhancement technologies (RETs) such as phase shift masks (PSMs), off-axis illumination (OAI), optical proximity correction (OPC), and inverse lithography technology (ILT). In some cases, RETs may be used to modify mask layouts to compensate for processing limitations used in the manufacture of an IC and which manifest themselves as process technology nodes are scaled down. Without RETs, simple scaling down of layout designs used at larger nodes often results in inaccurate or poorly shaped features. Moreover, and because of imperfections of a mask making process, a mask pattern formed on a photomask may be different from a desired mask layout. As such, mask process correction (MPC) processes may also be used to compensate for defects introduced during the mask making process.

Computational lithography techniques in particular, such as OPC, ILT, and MPC, rely on robust lithography models that are predictive of actual lithographic processes. Generally, lithography model calibration involves adjusting various parameters of a lithography model such that predictions of the lithography model represent a best-fit of measured calibration data. Because of the potentially large amounts of calibration data, and because lithography itself is a complex semiconductor manufacturing process, lithography simulation is a computationally intensive process. As such, in some examples, at least some existing lithographic simulation techniques can be both time-consuming and insufficiently accurate. Thus, existing techniques have not proved entirely satisfactory in all respects.

BRIEF DESCRIPTION OF THE DRAWINGS

Aspects of the present disclosure are best understood from the following detailed description when they are read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to using a neural network for calibration of a lithography model used for lithography simulation. In various embodiments, such lithography models may be used in computational lithography techniques such as optical proximity correction (OPC), inverse lithography technology (ILT), and mask process correction (MPC), which rely on robust lithography models that are predictive of actual lithographic processes. The various embodiments described herein also provide for lithography model calibration using both critical dimension (CD)-based calibration and contour-based calibration, as described in more detail below. As a result, embodiments of the present disclosure provide for lithography models with enhanced accuracy. Further, in accordance with some embodiments, total lithography simulation time can be reduced and computational lithography techniques (e.g., OPC, ILT, MPC) may be applied in a more efficient manner.

Figure 1:
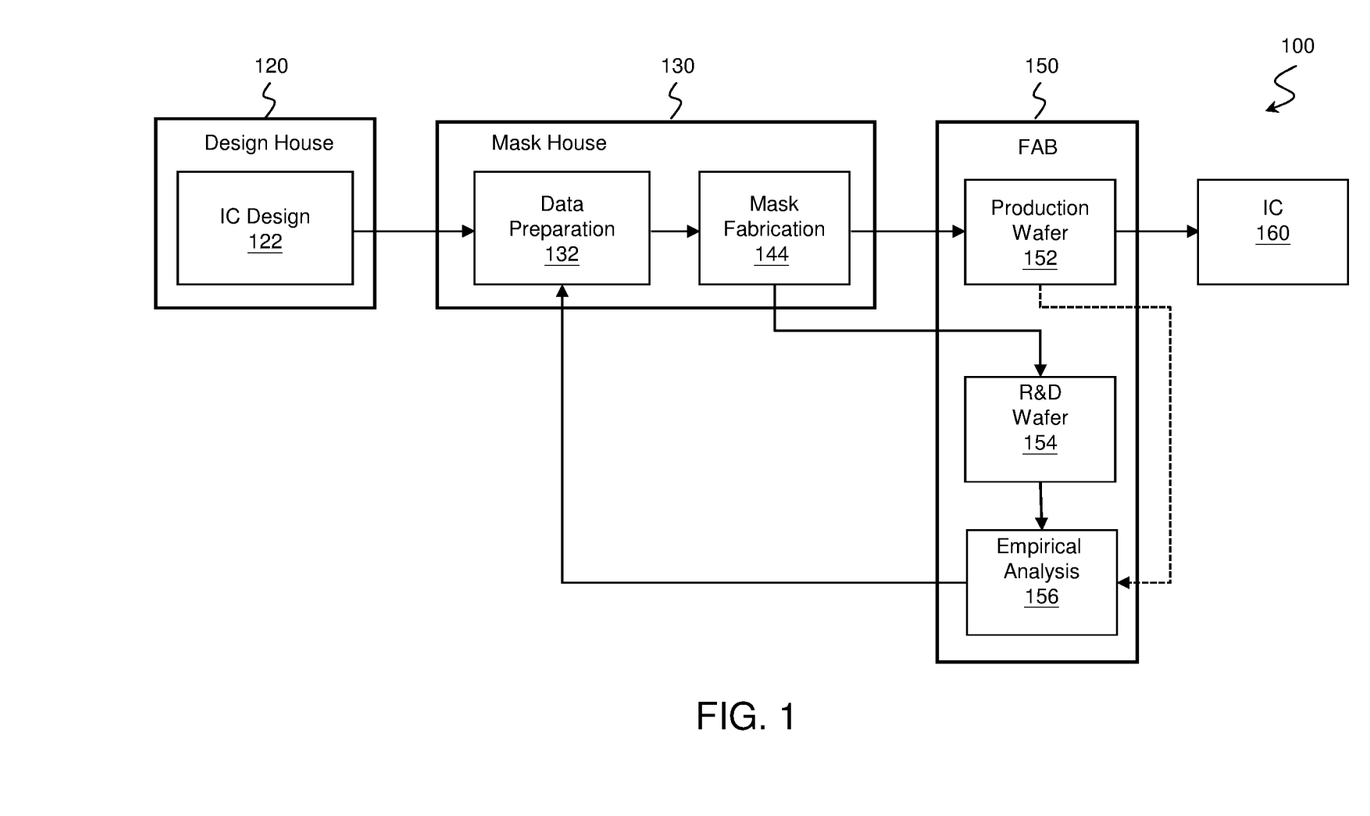
FIG. 1 is a simplified block diagram of an embodiment of an integrated circuit (IC) manufacturing system and an associated IC manufacturing flow.

To provide further understanding regarding the context of the present disclosure, FIG. 1 provides a simplified block diagram of an embodiment of an integrated circuit (IC) manufacturing system 100 and an IC manufacturing flow associated therewith, which may benefit from various aspects of the present disclosure. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an integrated circuit (IC) device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 130, and IC manufacturer 150 may have a common owner, and may even coexist in a common facility and use common resources.

In various embodiments, the design house 120, which may include one or more design teams, generates an IC design layout 122. The IC design layout 122 may include various geometrical patterns designed for the fabrication of the IC device 160. By way of example, the geometrical patterns may correspond to patterns of metal, oxide, or semiconductor layers that make up the various components of the IC device 160 to be fabricated. The various layers combine to form various features of the IC device 160. For example, various portions of the IC design layout 122 may include features such as an active region, a gate electrode, source and drain regions, metal lines or vias of a metal interconnect, openings for bond pads, as well as other features known in the art which are to be formed within or on a semiconductor substrate (e.g., such as a silicon wafer) and various material layers disposed on the semiconductor substrate. In various examples, the design house 120 implements a design procedure to form the IC design layout 122. The design procedure may include logic design, physical design, and/or place and route. The IC design layout 122 may be presented in one or more data files having information related to the geometrical patterns which are to be used for fabrication of the IC device 160. In some examples, the IC design layout 122 may be expressed in an Open Artwork System Interchange Standard (OASIS) file format, a GDSII file format, or DFII file format.

In some embodiments, the design house 120 may transmit the IC design layout 122 to the mask house 130, for example, via the network connection described above. The mask house 130 may then use the IC design layout 122 to manufacture one or more masks to be used for fabrication of the various layers of the IC device 160 according to the IC design layout 122. In various examples, the mask house 130 performs mask data preparation 132, where the IC design layout 122 is translated into a form that can be physically written by a mask writer, and mask fabrication 144, where the design layout prepared by the mask data preparation 132 is modified to comply with a particular mask writer and/or mask manufacturer and is then fabricated. In the example of FIG. 1, the mask data preparation 132 and mask fabrication 144 are illustrated as separate elements; however, in some embodiments, the mask data preparation 132 and mask fabrication 144 may be collectively referred to as mask data preparation.

In some examples, the mask data preparation 132 includes application of one or more resolution enhancement technologies (RETs) such as phase shift masks (PSMs), off-axis illumination (OAI), optical proximity correction (OPC), and inverse lithography technology (ILT) to compensate for potential lithography errors, such as those that can arise from diffraction, interference, or other process effects. In some embodiments, RETs (e.g., such as OPC or ILT) may be used to modify mask layouts to compensate for processing limitations used in the manufacture of an IC and which manifest themselves as process technology nodes are scaled down. Without RETs, simple scaling down of layout designs used at larger nodes often results in inaccurate or poorly shaped features. In various examples, OPC may be used to adjust line widths depending on the density of surrounding geometries, add "dog-bone" end-caps to the end of lines to prevent line end shortening, correct for electron beam (e-beam) proximity effects, or for other purposes. OPC may also be used to add sub-resolution assist features (SRAFs) such as scattering bars, serifs, and/or hammerheads to the IC design layout 122 according to a lithography model such that, after a lithography process, a final pattern on a wafer is improved with enhanced resolution and precision. Calibration of the lithography model (e.g., which is predictive of one or more lithographic processes), according to embodiments disclosed herein, can be performed to further enhance such OPC (or ILT) processes.

The mask data preparation 132 may further include mask process correction (MPC) that is used to correct errors introduced during the mask making process. For example, MPC may be used to correct mask making process effects such as fogging, development and etch loading and e-beam proximity effects. In some examples, the MPC process modifies a post-OPC design layout to compensate for limitations which may be encountered during mask fabrication 144. MPC processes similarly rely on models (e.g., predictive of a mask making process), which may also be calibrated in accordance with various embodiments, to improve the MPC process.

In some embodiments, the mask data preparation 132 may further include lithography process checking (LPC) that simulates processing that will be implemented by the IC manufacturer 150 to fabricate the IC device 160. The LPC may simulate this processing based on the IC design layout 122 to create a simulated manufactured device, such as the IC device 160. The processing parameters in LPC simulation may include parameters associated with various processes of the IC manufacturing cycle, parameters associated with tools used for manufacturing the IC, and/or other aspects of the manufacturing process. By way of example, LPC may take into account various factors, such as aerial image contrast, depth of focus ("DOF"), mask error enhancement factor ("MEEF"), other suitable factors, or combinations thereof. The models used during LPC simulation may similarly benefit from model calibration, according to the various embodiments.

In some embodiments, after a simulated manufactured device has been created by LPC, if the simulated device layout is not close enough in shape to satisfy design rules, certain steps in the mask data preparation 132, such as OPC, ILT, and/or MPC, may be repeated to refine the IC design layout 122 further.

It should be understood that the above description of the mask data preparation 132 has been simplified for the purposes of clarity, and data preparation may include additional features such as a logic operation (LOP) to modify the IC design layout according to manufacturing rules. Additionally, the processes applied to the IC design layout 122 during data preparation 132 may be executed in a variety of different orders.

After mask data preparation 132 and during mask fabrication 144, a mask or a group of masks may be fabricated based on the modified IC design layout. For example, an electron-beam (e-beam) or a mechanism of multiple e-beams is used to form a pattern on a mask (photomask or reticle) based on the modified IC design layout. The mask can be formed in various technologies. In an embodiment, the mask is formed using binary technology. In some embodiments, a mask pattern includes opaque regions and transparent regions. A radiation beam, such as an ultraviolet (UV) beam, used to expose a radiation-sensitive material layer (e.g., photoresist) coated on a wafer, is blocked by the opaque region and transmitted through the transparent regions. In one example, a binary mask includes a transparent substrate (e.g., fused quartz) and an opaque material (e.g., chromium) coated in the opaque regions of the mask. In some examples, the mask is formed using a phase shift technology. In a phase shift mask (PSM), various features in the pattern formed on the mask are configured to have a pre-configured phase difference to enhance image resolution and imaging quality. In various examples, the phase shift mask can be an attenuated PSM or alternating PSM.

In some embodiments, the IC manufacturer 150, such as a semiconductor foundry, uses the mask (or masks) fabricated by the mask house 130 to transfer one or more mask patterns onto a production wafer 152 and thus fabricate the IC device 160 on the production wafer 152. The IC manufacturer 150 may include an IC fabrication facility that may include a myriad of manufacturing facilities for the fabrication of a variety of different IC products. For example, the IC manufacturer 150 may include a first manufacturing facility for front end fabrication of a plurality of IC products (i.e., front-end-of-line (FEOL) fabrication), while a second manufacturing facility may provide back end fabrication for the interconnection and packaging of the IC products (i.e., back-end-of-line (BEOL) fabrication), and a third manufacturing facility may provide other services for the foundry business. In various embodiments, the semiconductor wafer (i.e., the production wafer 152) within and/or upon which the IC device 160 is fabricated may include a silicon substrate or other substrate having material layers formed thereon. Other substrate materials may include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. In some embodiments, the semiconductor wafer may further include various doped regions, dielectric features, and multilevel interconnects (formed at subsequent manufacturing steps). Moreover, the mask (or masks) may be used in a variety of processes. For example, the mask (or masks) may be used in an ion implantation process to form various doped regions in the semiconductor wafer, in an etching process to form various etching regions in the semiconductor wafer, and/or in other suitable processes.

As further shown in FIG. 1, and in some examples, the IC manufacturer 150 may use the mask (or masks) fabricated by the mask house 130 to transfer one or more mask patterns onto an R&D wafer 154. After processing of the R&D wafer 154, the R&D wafer 154 may then be transferred to a test lab (e.g., metrology lab or parametric test lab) for empirical analysis 156. In some embodiments, empirical data collected from the R&D wafer 154 may be transferred to the mask house 130, where the IC design layout 122 may be further modified (if needed) based on the empirical data. In some embodiments, the IC manufacturer 150 may use production wafers 152 or R&D wafers 154 to collect calibration data using empirical analysis 156, where the calibration data may be used for lithography model calibration, in accordance with various embodiments. In various examples, the measured calibration data may include one-dimensional (1D) wafer CD data or two-dimensional (2D) shape contour data measured using a scanning electron microscope (SEM). As used herein, "contour" is used to mean an outline or perimeter of a shape.

Figure 2:
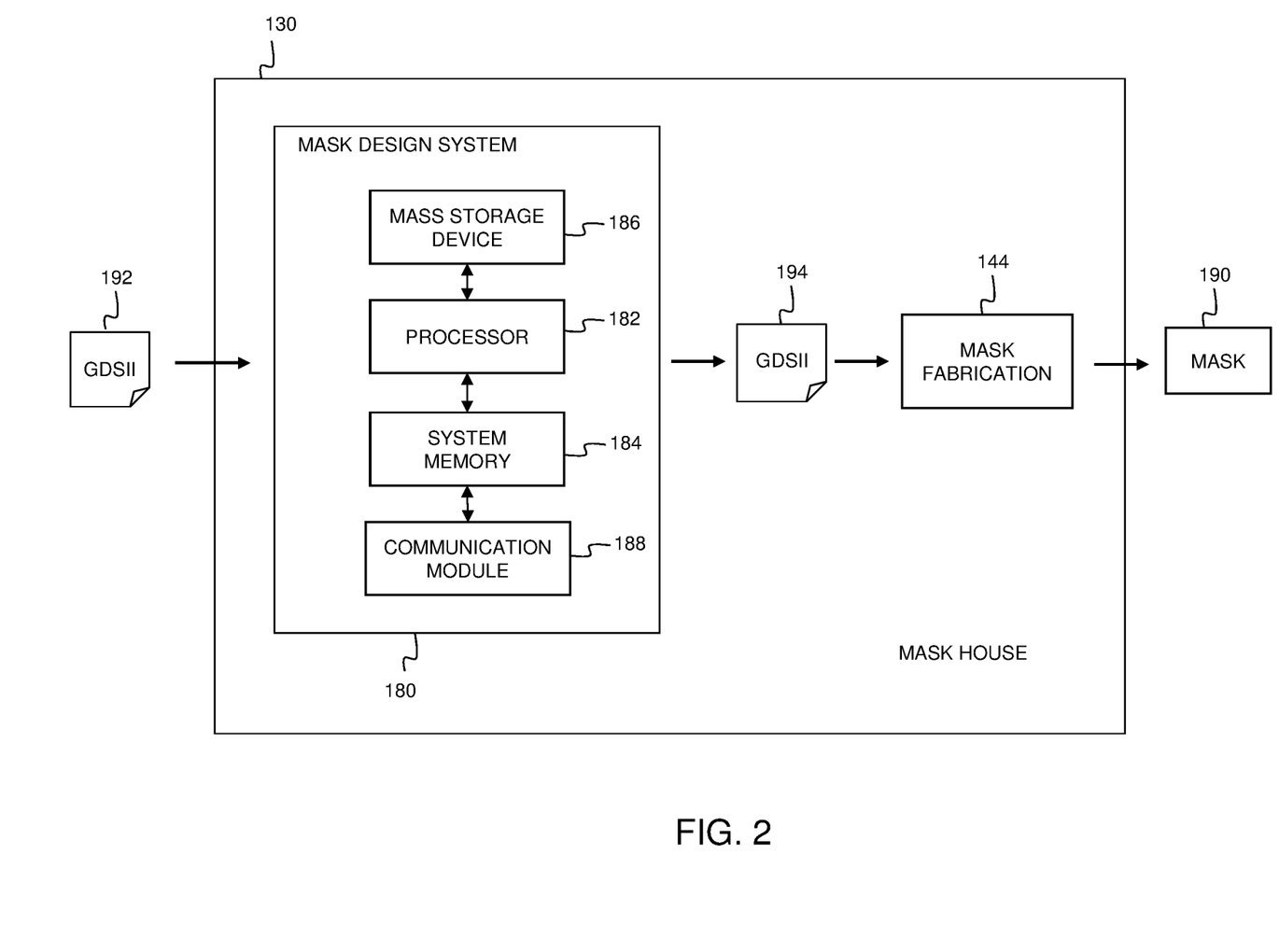
FIG. 2 is a more detailed block diagram of the mask house shown in FIG. 1 according to various aspects of the present disclosure.

Referring now to FIG. 2, provided therein is a more detailed block diagram of the mask house 130 shown in FIG. 1 according to various aspects of the present disclosure. In the example of FIG. 2, the mask house 130 includes a mask design system 180 that is operable to perform the functionality described in association with mask data preparation 132 of FIG. 1 and in association with methods 400, 500, and 550 of FIGS. 4, 5, and 6, discussed below. The mask design system 180 is an information handling system such as a computer, server, workstation, or other suitable device. The system 180 includes a processor 182 that is communicatively coupled to a system memory 184, a mass storage device 186, and a communication module 188. The system memory 184 provides the processor 182 with non-transitory, computer-readable storage to facilitate execution of computer instructions by the processor. Examples of system memory 184 may include random access memory (RAM) devices such as dynamic RAM (DRAM), synchronous DRAM (SDRAM), solid state memory devices, and/or a variety of other memory devices known in the art. Computer programs, instructions, and data are stored within the mass storage device 186. Examples of mass storage devices 186 may include hard discs, optical disks, magneto-optical discs, solid-state storage devices, and/or a variety of other mass storage devices. The communication module 188 is operable to communicate information such as IC design layout files with the other components in the IC manufacturing system 100, such as design house 120. Examples of communication modules 188 may include Ethernet cards, 802.11 WiFi devices, cellular data radios, and/or other suitable devices known in the art.

In operation, the mask design system 180 is configured to manipulate the IC design layout 122 according to a variety of design rules and limitations before it is transferred to a mask 190 by mask fabrication 144. For example, in an embodiment, mask data preparation 132, including ILT, OPC, MPC, and LPC, may be implemented as software instructions executing on the mask design system 180. In such an embodiment, the mask design system 180 receives a first GDSII file 192 containing the IC design layout 122 from the design house 120. After the mask data preparation 132 is complete, which in some embodiments may be after completion of the methods 400, 500, and/or 550 of FIGS. 4, 5, and 6, the mask design system 180 transmits a second GDSII file 194 containing a modified IC design layout to mask fabrication 144 (i.e., to a mask fabricator). In alternative embodiments, the IC design layout 122 may be transmitted between the components in IC manufacturing system 100 in alternate file formats such as DFII, CIF, OASIS, or any other suitable file type. Further, the mask design system 180 and the mask house 130 may include additional and/or different components in alternative embodiments. Additionally, and in accordance with various embodiments, the mask design system 180 (or an information handling system in communication with the mask design system 180) may implement the neural network, and/or associated functions described herein (e.g., such as described with reference to FIGS. 4-7), used for calibration of a lithography model.

As previously noted, the present disclosure is generally related to using a neural network for calibration of a lithography model used for lithography simulation. Lithography models, in general, may include an optical model portion and a resist model portion. The optical model portion is characterized by the performance of optical components of a lithography system (e.g., such as illumination and projection components), and the resist model portion is characterized by physical phenomenon that occur within the resist (e.g., during exposure, baking, and development). In some cases, optical properties of the resist (e.g., refractive index and film thickness) may be included as part of the optical model portion.

In various embodiments, lithography model calibration involves adjusting parameters of a lithography model such that predictions of the lithography model represent a best-fit of measured calibration data. As described above, calibration data may include 1D wafer CD data or 2D shape contour data. Calibration of a lithography model using 1D wafer CD data may be referred to as CD-based calibration, and calibration of a lithography model using 2D shape contour data may be referred to as contour-based calibration. The measured calibration data described herein, whether 1D wafer CD data or 2D shape contour data, may include measurements of patterns imaged onto a semiconductor wafer (e.g., a production wafer 152 or an R&D wafer 154) using a mask (or masks) fabricated by the mask house 130 and appropriate lithographic processes (e.g., resist coating, baking, exposure, development). Generally, 2D shape contour data provides more information than 1D wafer CD data. Thus, 2D shape contour data can be used to reduce SEM measurement time while providing more measured calibration data to improve lithography model calibration.

Lithography is a complex semiconductor manufacturing process and lithography simulation is thus a computationally intensive process. In particular, given the large amounts of 1D and/or 2D measured calibration data that can be generated during metrology (empirical analysis 156), performing lithography simulation in a reasonable amount of time can be a challenge. To reduce simulation time, and to improve the accuracy of the lithography model, machine learning models such as artificial neural networks may be employed. In various examples, a neural network may include a mathematical model used for modeling complex relationships between inputs and outputs or to find patterns in data. Additional details regarding neural networks as applied to the embodiments disclosed herein are provided in more detail below with respect to FIGS. 4-7.

Figure 3:
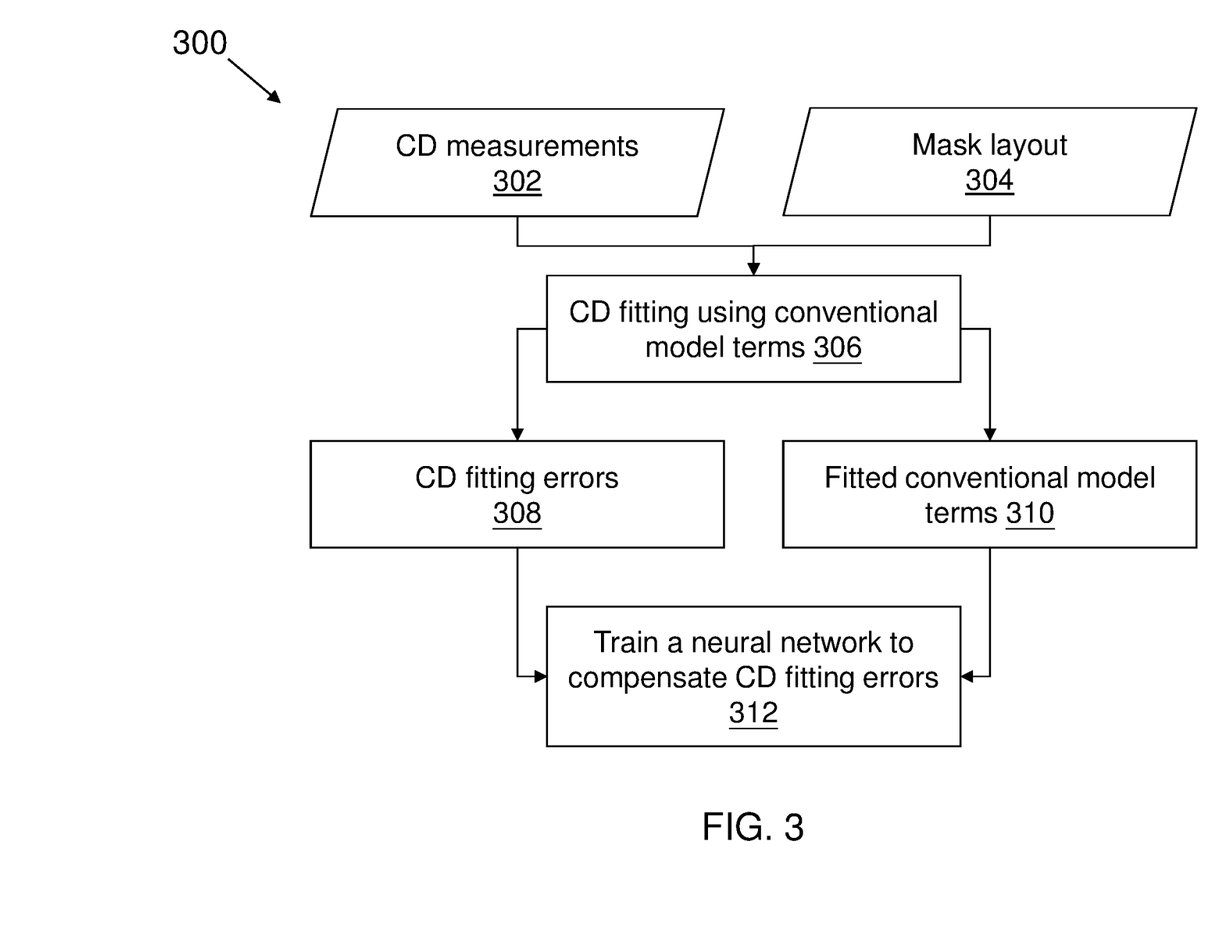
FIG. 3 is a flow chart of an exemplary CD-based lithography model calibration method.

In some existing techniques, machine learning assisted lithography model calibration employs neural networks to compensate for errors in a conventional lithography model using only CD-based calibration. For instance, with reference to FIG. 3, illustrated therein is a flow chart of an exemplary CD-based lithography model calibration method 300. In some examples, the method 300 may be implemented in the mask data preparation 132 of mask house 130 shown in FIG. 1. At block 302 of the method 300, 1D wafer CD data is measured (e.g., using empirical analysis 156). By way of example, and at block 306 of the method 300, the measured CD data (block 302) and a mask layout (block 304) are used to perform a fitting of the simulation CD data to the measured CD data using conventional lithography model terms. In some cases, the conventional lithography model terms may include optical model terms (e.g., such as partially coherent Hopkins kernels), resist model terms (e.g., such as loading, slope, and curvature terms), and/or other appropriate terms. As a result of the CD fitting (block 306), CD fitting errors are generated (block 308) for each CD measurement. Further, and also as a result of the CD fitting (block 306), fitted conventional model terms are provided at block 310. Thereafter, at block 312, the CD fitting errors (block 308) and the fitted conventional model terms (block 310) are used to train a neural network to compensate for the CD fitting errors for each CD measurement. Block 312 of the method 300 may output a final lithography model that can thus be used to improve lithography simulation.

In contrast to the aforementioned example, embodiments of the present disclosure provide a machine learning assisted lithography model calibration method utilizing a neural network to compensate for errors in a conventional lithography model using both CD-based calibration and contour-based calibration. By way of example, for each measurement site (e.g., CD or contour measurement site), the disclosed neural network uses an aerial image (e.g., generated using a conventional lithography model) and one or more rasterized mask layout images as inputs to the neural network, and outputs a 2D ideal image. For purposes of this disclosure, an "ideal image" includes a simulated CD or contour that perfectly matches (e.g., is substantially equal to) the corresponding CD or contour measurement data. In contrast, at least some existing techniques (e.g., method 300 of FIG. 3) use simulated signals or images from the conventional lithography model as an input to the neural network and provide a threshold difference or 1D aerial intensity difference as the output. As discussed in more detail below, various embodiments also provide for simulating/predicting single pixel values of an image, which provides an increased ability to find CD errors. Moreover, by utilizing contour-based calibration alone, or in conjunction with CD-based calibration, embodiments of the present disclosure can provide a more accurate lithography simulation, while also reducing SEM measurement time. Contour-based training of neural networks also helps to avoid over-training while providing a more robust network. In accordance with various embodiments, the disclosed methods remain accurate for large-area image calculation, making the present methods more efficient when applied to various computational lithography techniques (e.g., OPC, ILT, MPC). By employing the machine learning assisted lithography model calibration method described herein, at least some of time-consuming conventional model terms can be dropped, and total image simulation time can be reduced by about 15-30%.

Figure 4:
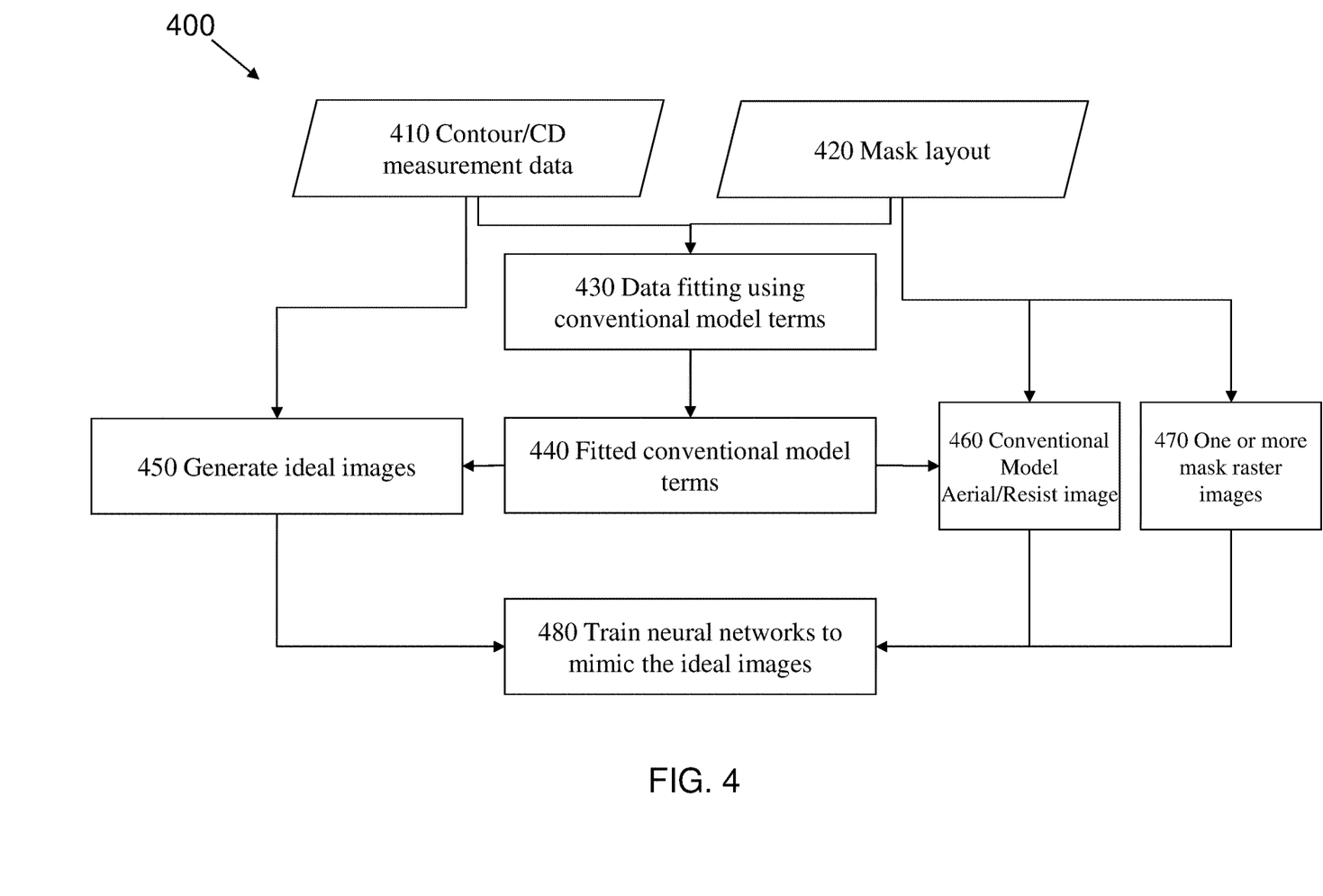
FIG. 4 is a flow chart of an exemplary contour/CD-based lithography model calibration method, in accordance with various embodiments.

With reference now to FIG. 4, illustrated therein is a method 400 which illustrates a flow chart of an exemplary contour/CD-based lithography model calibration method, in accordance with various embodiments. In some embodiments, aspects of the method 400 may include modifying an IC design layout before mask fabrication. In some embodiments, the method 400 may be implemented in the mask data preparation 132 of mask house 130 shown in FIG. 1. Additional operations can be provided before, during, and after the method 400, and some operations described can be replaced, eliminated, or moved around for additional embodiments of the method. It is also noted that the method 400 is exemplary and is not intended to limit the present disclosure beyond what is explicitly recited in the claims that follow.

In some embodiments, the method 400 begins at block 410, where contour data and/or CD data is measured (e.g., using empirical analysis 156). This contrasts with the method 300, where only CD data is measured. By way of example, and at block 430, the measured contour data and/or CD data (block 410) and a mask layout (block 420) are used to perform a fitting of the simulation contour data and/or simulation CD data to the measured contour data and/or CD data using conventional lithography model terms. In some embodiments, the conventional lithography model terms may include optical model terms (e.g., such as partially coherent Hopkins kernels), resist model terms (e.g., such as loading, slope, and curvature terms), and/or other appropriate terms. As a result of the fitting (block 430), fitted conventional model terms are provided at block 440.

At block 450, the method 400 uses the measured contour data and/or CD data (block 410), and the fitted conventional model terms (block 440), to generate ideal images. As described above, an ideal image includes a simulated CD or contour that perfectly matches the corresponding measured contour data and/or CD data. In some cases, the method 400 also uses the fitted conventional model terms (block 440) and the mask layout (block 420) to generate (simulate) a conventional model aerial and/or resist image (block 460). Further, the method 400 can use the mask layout (block 420) to generate (simulate) one or more mask raster images (block 470). In some examples, the mask layout (block 420) is provided in a standard format (e.g., such as GDSII or OASIS) and is converted (reformatted) to the one or more raster images (block 470). By way of example, a generated raster image may include a grid of pixels that collectively form the raster image. In some cases, a plurality of raster images is generated for each measurement site (e.g., contour or CD measurement site), where the plurality of raster images for a given measurement site have different pixel sizes (e.g., 2 nm×2 nm, 8 nm×8 nm, or other suitable pixel sizes).

Thereafter, in some embodiments and at block 480, the ideal images (block 450), the conventional model aerial and/or resist image (block 460), and the one or more raster images (block 470) are used to train a neural network to mimic the ideal images for each contour or CD measurement site. In various examples, the ideal images generated at block 450 provide a target output of the neural network, while the conventional model aerial and/or resist image (block 460) and the one or more raster images (block 470) provide inputs to the neural network. In some embodiments, block 480 may output a final lithography model that can thus be used to improve lithography simulation. For example, the final calibrated lithography model may be used to implement one of more computational lithography methods (e.g., OPC, ILT, MPC, LPC) prior to mask fabrication (e.g., by mask fabrication 144) and wafer patterning (e.g., by a lithography process), as discussed above.

Figure 5:
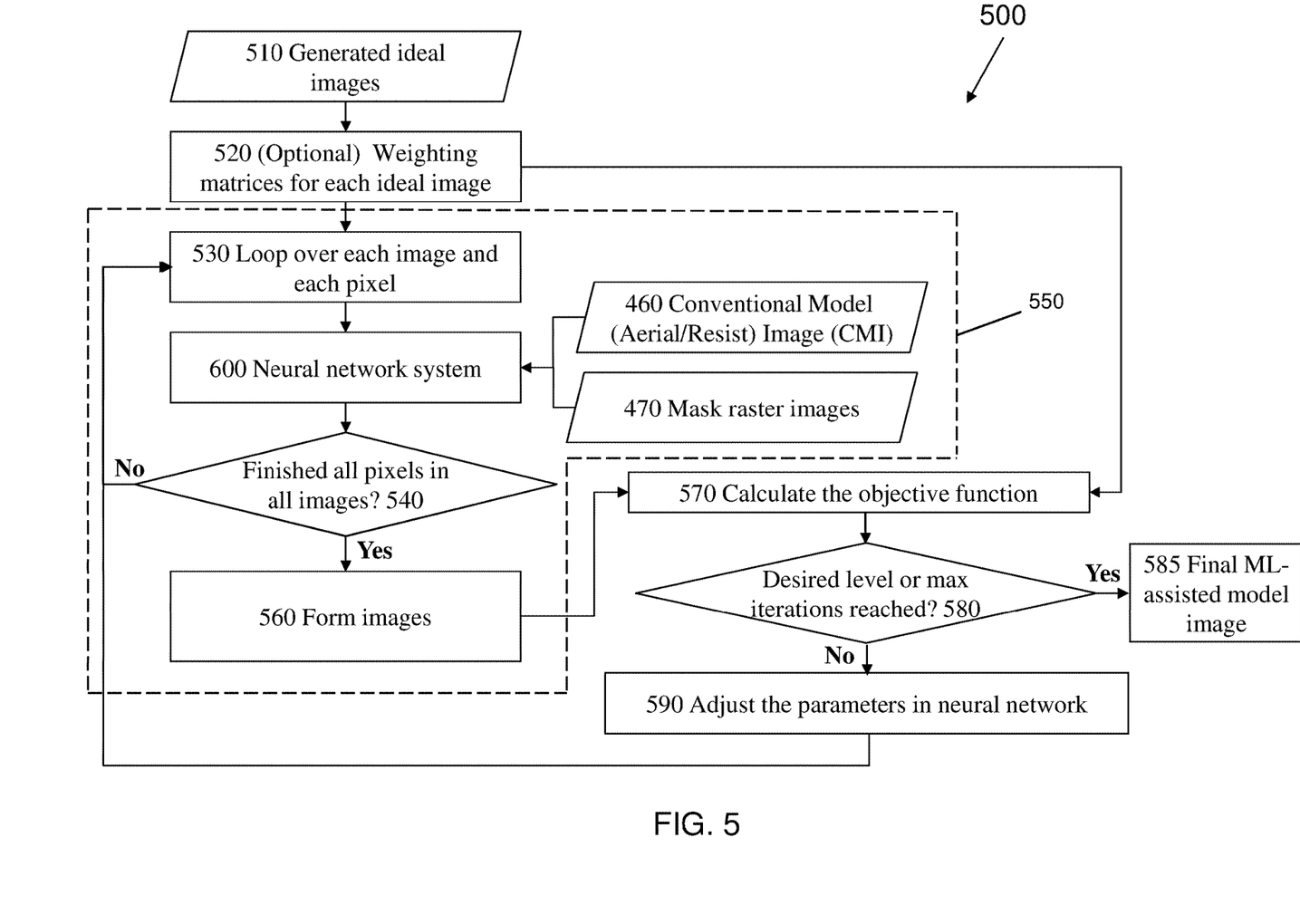
FIG. 5 illustrates a flow diagram for training the neural network to mimic the ideal images for each contour and/or CD measurement site, in accordance with some embodiments.

Referring now to FIG. 5, illustrated therein is a method 500 for training the neural network to mimic the ideal images for each contour and/or CD measurement site, in accordance with some embodiments. In other words, the method 500 describes a process flow associated with the block 480 of FIG. 4. Initially, at block 510, the generated ideal images (the same ideal images generated at block 450 of FIG. 4, and which provide a target output of the neural network) are used to generate weighting matrices for each ideal image (block 520). In some embodiments, a weight matrix for an ideal image provides a plurality of multiplication factors, each multiplication factor associated with a different portion of the ideal image (e.g., for different pixel(s) of the ideal image), thereby providing different weights for each different portion of the ideal image. It is noted that in various embodiments, providing the weighting matrices (block 520) is optional. The weighting matrices, if provided, may be used for objective function calculation (block 570), as discussed below. Generally, with respect to neural networks, an objective function may include a mean squared error function (loss/cost function). In various examples, it is desirable to find optimized weight values to minimize the objective function. By way of illustration, the weighting matrices may be used in various circumstances. For example, if a first pattern with a first CD value is more critical than a second pattern with a second CD value greater than the first CD value, the weighting matrices can be used to assign a greater weight to the first pattern than to the second pattern. In another example, it may be desirable to focus on certain pixels within a pattern having signals close to a threshold value (e.g., the threshold value used to determine CD or contour data). In such a case, these certain pixels may determine the simulation CD and contour data. As a result, the weighting matrices may be used to assign a greater weight to these certain pixels (e.g., as compared to the weights of other pixels in the pattern).

After optionally generating the weighting matrices (block 520), the method 500 proceeds to block 530 where the system (e.g., the neural network) loops over each pixel of each generated ideal image (block 510). The phrase "loops over each pixel" may be used to describe a nested iteration process, where each pixel of each ideal image (pixels in every column and row of each ideal image) is systematically processed. In various embodiments, an index value of each pixel of each image (from block 530) that is currently being processed is provided to a neural network system (block 600), as described in more detail below with respect to FIG. 6. In addition to the index value (from block 530), the conventional model aerial and/or resist image (block 460) and the one or more raster images (block 470) are provided to the neural network system 600. This process is also described in more detail below with reference to FIG. 6. At block 540, it is determined whether the system has looped over each pixel of each generated ideal image. If not, the method 500 returns to block 530, where the index value is incremented, and a subsequent pixel is processed by the neural network system (block 600). If the system has looped over each pixel of each generated ideal image (at block 540), then the method 500 proceeds to block 560 where the neural network system forms (simulates) images using the conventional model aerial and/or resist image (block 460) and the one or more raster images (block 470) as inputs. In various examples, the images formed by the neural network system (at block 560) correspond to the generated ideal images (block 510), which provide the target output of the neural network.

Figure 7:
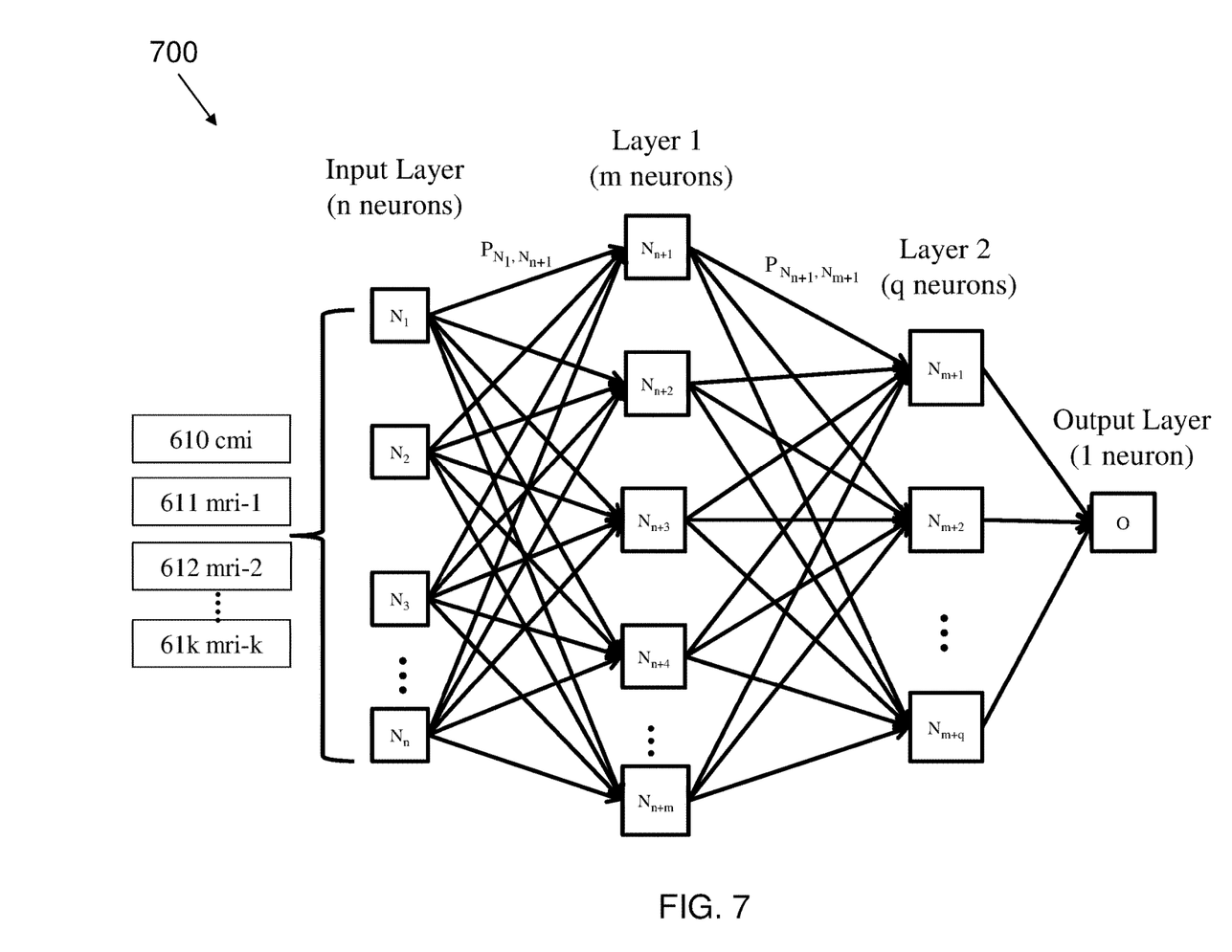
FIG. 7 illustrates an exemplary embodiment of a neural network, in accordance with some embodiments.

After forming the images (at block 560), the method 500 proceeds to block 570 where the objective function is calculated. Generally, the objective function may be calculated by comparing the images formed at block 560 to the ideal images generated at block 510 (with the optional weighting matrices provided block 520). More specifically, and in some embodiments, the objective function is defined as $$\operatorname*{argmin}_{P} \sum_{i=1}^{n} w_i (I_i - G_i)^2,$$

where $I_i$ is the intensity of the ith pixel of the ideal image (block 510), $G_i$ is the intensity of the ith pixel of the image formed by the neural network (at block 560), $w_i$ is the weight of the ith pixel (from block 520), and P is a set of parameters within the neural network (described in more detail with reference to FIG. 7). As noted above, an objective function may include a mean squared error function, where it is generally desirable to find optimized weight values to minimize the mean squared error function. In the present example, the argmin( ) function returns values P for which the specified summation function attains its minimum value.

After calculating the objective function (block 570), it is determined whether the calculated value of the objective function is at a desired (target) level (e.g., at a desired minimum error value) or whether a maximum number of iterations of the neural network has been reached (block 580). If so, a final ML-assisted lithography model is provided (block 585). If the objective function is not at a desired level and the maximum number of iterations of the neural network has not been reached (at block 580), then the parameters P of the neural network system are adjusted (at block 590) using a backpropagation method. Generally, backpropagation is an iterative method for updating the weights of the neural network to improve the network until it is able to perform the task for which it is being trained (e.g., providing ML-assisted model images that closely match the target output, which is the generated ideal images from block 510). After adjusting the parameters P of the neural network (e.g., the weights of the neural network), the method 500 returns to block 530 where the system loops over each pixel of each image generated during the previous iteration of the neural network (e.g., the images generated at block 560). This iterative process may be repeated until the objective function is at a desired level (e.g., at a desired minimum error value) or until a maximum number of iterations of the neural network has been reached, thereby providing the final ML-assisted lithography model (block 585). In various examples, the final ML-assisted calibrated lithography model (block 585) may be used to generate a final ML-assisted model image.

Figure 6:
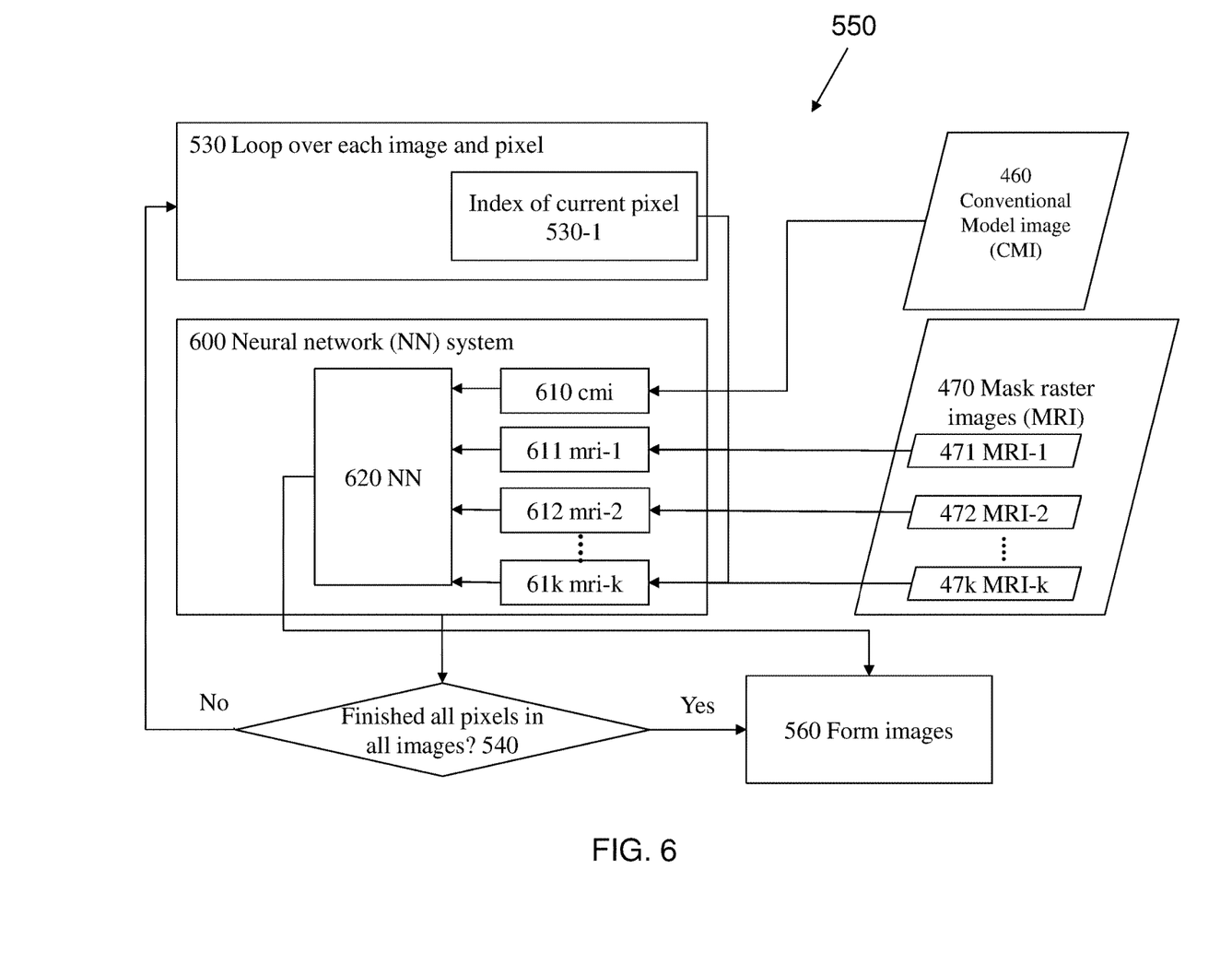
FIG. 6 illustrates a portion of the flow diagram of FIG. 5 and provides more detail regarding the neural network system and its associated inputs and outputs, in accordance with some embodiments.

Elaborating on the neural network system and its associated inputs and outputs, FIG. 6 provides a more detailed view of a portion 550 of the method 500, which includes the blocks 530, 600, 540, 560, 460, and 470, described above. As previously noted, block 530 may provide an index value 530-1 of each pixel of each image (that is currently being processed) to the neural network system (block 600). The conventional model aerial and/or resist image (block 460) may be provided as an input 610 of the neural network system 600, and the one or more raster images (block 470) may be provided as inputs 611, 612, 61$k$ of the neural network system (block 600). In particular, as shown in FIG. 6, the plurality of raster images (block 470) may include k mask raster images (MRI) having k different pixel sizes or k different resolutions. In the present example, the plurality of raster images includes a first raster image 471 (MRI-1), a second raster image 472 (MRI-2), and a kth raster image 47$k$ (MRI-k). Thus, in some embodiments, each of the first raster image 471, the second raster image 472, and the kth raster image 47$k$ have different pixel sizes or different resolutions. For instance, the first raster image 471 (MRI-1) may correspond to the finest resolution while the kth raster image 47$k$ (MRI-k) corresponds to the most course resolution.

In various embodiments, the input 610 may crop the conventional model aerial and/or resist image in a region corresponding to the index value 530-1 of the pixel that is currently being processed by the neural network system 600. Similarly, in some embodiments, the inputs 611, 612, 61$k$ may crop the k mask raster images (MRI) also in a region corresponding to the index value 530-1 of the pixel that is currently being processed by the neural network system 600. In various examples, each of the inputs 610, 611, 612, and 61$k$ are then provided to a neural network 620. In various embodiments, the neural network 620 may include a feed-forward neural network, a radial basis function neural network, a multilayer perceptron, a convolutional neural network, a recurrent neural network, a modular neural network, a sequence-to-sequence model, or other appropriate neural network. An embodiment of a particular neural network, described in the context of the present disclosure, is discussed in more detail below with reference to FIG. 7. After the inputs to the neural network 620 are processed, it is determined whether the neural network system 600 has looped over each pixel of each generated ideal image. If not, as previously described, the method 500 returns to block 530, where the index value is incremented, and a subsequent pixel is processed by the neural network system (block 600). If the neural network system 600 has looped over each pixel of each generated ideal image (at block 540), then the method 500 proceeds to block 560 where the neural network system forms (simulates) images. Stated another way, images formed by the neural network system (at block 560) may be formed by summation of the collected outputs of the neural network 620.

Referring now to FIG. 7, illustrated therein is an exemplary embodiment of a neural network 700. In some cases, the neural network 700 may be used to implement the neural network 620, discussed above. The neural network 700 provides a four-layer neural network (having two hidden layers), though it is understood that the neural network 700 may include a different number of layers in other embodiments. In the present example, the neural network 700 includes an input layer having n neurons, a first layer (Layer 1) having m neurons, a second layer (Layer 2) having q neurons, and an output layer having one (1) neuron. However, a different number of neurons for each layer of the neural network 700 may also be used without departing from the scope of the present disclosure. Generally, a neuron in a neural network provides a weighted sum of inputs and passes the weighted sum to an activation function to provide an output of the neuron. In some embodiments, adjacent layers within the neural network 700 may be fully connected, meaning that neurons in a fully connected layer have connections to all activations (outputs) from the previous layer. Various embodiments of the neural network 700 may include more than one fully connected layer.

As shown in FIG. 7, the inputs 610, 611, 612, and 61$k$ (discussed above) are provided as inputs to the input layer of the neural network 700. The inputs 610, 611, 612, and 61$k$ may correspond to a particular image pixel that is currently being processed by the neural network. In some embodiments, each of the inputs 610, 611, 612, and 61$k$ become input neurons. Stated another way, and in some examples, each value for each of the inputs 610, 611, 612, and 61$k$ is a neuron within the input layer. Connections between neurons in adjacent layers may be signified by an arrow and a parameter $P_{i,j}$, where i and j represent sending and receiving neurons, respectively, within adjacent layers. For instance, neuron 'N1' in the input layer is connected to neuron '$N_{n+1}$' in Layer 1 by the parameter $P_{N1,\ Nn+1}$, where $N_1$ represents the neuron 'N1' of the input layer and $N_{n+1}$ represents the neuron '$N_{n+1}$' of Layer 1. Further, in various examples, each of the parameters $P_{i,\ j}$ provides a value that is used to multiply an output of the sending neuron (e.g., such as 'N'), where the multiplied value is provided as an input to the receiving neuron (e.g., such as '$N_{n+1}$'). Thus, the parameters $P_{i,j}$ provides a weight to the signal transmitted between adjacent neurons. These parameters $P_{i,j}$ are the parameters that are therefore adjusted (using the backpropagation method, discussed above) to train the neural network. Moreover, the receiving neuron may process a plurality of such weighted signals (received from a plurality of sending neurons) to provide a weighted sum that is then provided to an activation function to generate an output of the receiving neuron. In some embodiments, the activation function used for each of the m neurons in Layer 1 and each of the q neurons in Layer 2 may include a rectified linear unit (ReLu) function defined as $f(x)=\max(0,x)$, where x is the weighted sum input. Thus, the ReLu function will output a value of zero (0) if the weighted sum input is negative or will output the input x itself if the input x is zero (0) or positive. As such, and with reference to the present example, a value of a neuron (output of the ReLu activation function) may be defined as $n_j=\max(0, \Sigma_i p_{i,j} \times n_i)$, which is essentially the greater of zero (0) and weighted sum input to the neuron. To be sure, in some embodiments, other activation functions may be used such as a linear activation function, a step activation function, a sigmoid activation function, a tanh activation function, or other appropriate activation function.

In addition, the various embodiments disclosed herein, including aspects of the methods 400, 500, and 550, may be implemented on any suitable computing system, such as the mask design system 180 described in association with FIG. 2. In some embodiments, aspects of the methods 400, 500, and 550 may be executed on a single computer, local area networks, client-server networks, wide area networks, internets, hand-held and other portable and wireless devices and networks. Such a system architecture may take the form of an entirely hardware embodiment, an entirely software embodiment, or an embodiment containing both hardware and software elements. By way of example, hardware may include at least processor-capable platforms, such as client-machines (also known as personal computers or servers), and hand-held processing devices (such as smart phones, personal digital assistants (PDAs), or personal computing devices (PCDs), for example). In addition, hardware may include any physical device that is capable of storing machine-readable instructions, such as memory or other data storage devices. Other forms of hardware include hardware sub-systems, including transfer devices such as modems, modem cards, ports, and port cards, for example. In various examples, software may include any machine code stored in any memory medium, such as RAM or ROM, and machine code stored on other devices (such as floppy disks, flash memory, or a CD-ROM, for example). In some embodiments, software may include source or object code, for example. In addition, software may encompass any set of instructions capable of being executed in a client machine or server.

Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium may be any apparatus that can contain, store, communicate, propagate, or transport the program for use by or in connection with the instruction execution system, apparatus, or device. The medium may be an electronic, magnetic, optical, electromagnetic, infrared, a semiconductor system (or apparatus or device), or a propagation medium.

In some embodiments, defined organizations of data known as data structures may be provided to enable one or more embodiments of the present disclosure. For example, a data structure may provide an organization of data, or an organization of executable code. In some examples, data signals may be carried across one or more transmission media and store and transport various data structures, and may thus be used to transport an embodiment of the present disclosure.

The embodiments of the present disclosure thus provide a neural network for calibration of a lithography model used for lithography simulation. In some embodiments, the calibrated lithography models may be used in computational lithography techniques such as OPC, ILT, MPC, and LPC which rely on robust lithography models that are predictive of actual lithographic processes. The various embodiments described herein also provide for lithography model calibration using both CD-based calibration and contour-based calibration. As a result, embodiments of the present disclosure provide for lithography models with enhanced accuracy. Moreover, in accordance with various embodiments, total lithography simulation time can be reduced and computational lithography techniques (e.g., OPC, ILT, MPC, LPC) may be applied in a more efficient manner. Those of skill in the art will readily appreciate that the methods described herein may be applied to a variety of other semiconductor layouts, semiconductor devices, and semiconductor processes to advantageously achieve similar benefits to those described herein without departing from the scope of the present disclosure.

Thus, one of the embodiments of the present disclosure described a method including generating an ideal image using measured contour data and fitted conventional model terms. The method further includes using the fitted conventional model terms and a mask layout to provide a conventional model aerial image. In some embodiments, the method further includes generating a plurality of mask raster images using the mask layout, where the plurality of mask raster images is generated for each measurement site of the measured contour data. In various embodiments, the method also include training a neural network to mimic the ideal image, where the generated ideal image provides a target output of the neural network, and where the conventional model aerial image and the plurality of mask raster images provide inputs to the neural network.

In another of the embodiments, discussed is a method including providing a plurality of images to a neural network, where the plurality of images provides a target output of the neural network. In some embodiments, the method further includes providing an aerial/resist image and a plurality of mask raster images as inputs to the neural network. In various embodiments and based on the target output and the inputs to the neural network, an objective function is calculated by comparing a plurality of neural network generated images to the plurality of images. After the calculating the objective function, a calibrated lithography model is generated.

In yet other embodiments, discussed is a method including training a neural network to output an ideal image, where the training includes providing the ideal image, an aerial/resist image, and a plurality of mask raster images to the neural network, where the ideal image is a target output of the neural network, and where the aerial/resist image and the plurality of mask raster images are inputs to the neural network. The training further includes based on the ideal image, the aerial/resist image, and the plurality of mask raster images, using the neural network to generate a simulated image. In some embodiments, the training further includes calculating an objective function by comparing the simulated image to the ideal image, and after the calculating the objective function, generating a final machine learning (ML)-assisted model image. In some embodiments, the method includes in response to the training the neural network, generating a calibrated lithography model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of semiconductor device fabrication, comprising:
   simulating an ideal image using measured contour data and fitted conventional model terms including both an optical model portion and a resist model portion;
   using the fitted conventional model terms and a mask layout to provide a conventional model aerial image;
   generating a plurality of mask raster images using the mask layout, wherein the plurality of mask raster images is generated for each measurement site of the measured contour data; and
   training a neural network to mimic the ideal image;
   wherein the simulated ideal image provides a target output of the neural network, and wherein the conventional model aerial image and the plurality of mask raster images provide inputs to the neural network.

2. The method of claim 1, wherein the ideal image includes simulated contour data that is substantially equal to corresponding contour measurement data.

3. The method of claim 1, wherein each of the plurality of mask raster images for a given measurement site have different pixel sizes.

4. The method of claim 1, further comprising: in response to the training the neural network, generating a calibrated lithography model.

5. The method of claim 4, wherein the calibrated lithography model is used to implement an optical proximity correction (OPC) process, an inverse lithography technology (ILT) process, or a mask process correction (MPC) process.

6. The method of claim 4, further comprising:
   using the calibrated lithography model to generate a modified mask layout pattern;
   fabricating a mask based on the modified mask layout pattern; and
   using the mask based on the modified mask layout pattern to pattern a wafer.

7. The method of claim 1, wherein the training the neural network further includes generating a weighting matrix corresponding to the ideal image.

8. The method of claim 1, wherein the training the neural network further includes using the neural network to simulate an image.

9. The method of claim 8, wherein the training the neural network further includes calculating an objective function by comparing the image simulated by the neural network to the ideal image.

10. The method of claim 9, further comprising: determining that a calculated value of the objective function satisfies a target level, and based on the determining, providing a final machine learning (ML)-assisted model image, wherein the ML-assisted model image is substantially equal to the ideal image.

11. The method of claim 9, further comprising: determining that a calculated value of the objective function does not satisfy a target level, and based on the determining, adjusting one or more parameters of the neural network using a backpropagation method.

12. The method of claim 1, wherein the ideal image includes simulated critical dimension (CD) data and simulated contour data that is substantially equal to corresponding CD measurement data and contour measurement data.

13. A method of semiconductor device fabrication, comprising:
   providing a plurality of images to a neural network, wherein the plurality of images provides a target output of the neural network, and wherein the plurality of images includes a plurality of ideal images including simulated critical dimension (CD) data and simulated contour data that is substantially equal to corresponding CD measurement data and contour measurement data;
   providing an aerial/resist image and a plurality of mask raster images as inputs to the neural network;
   based on the target output and the inputs to the neural network, calculating an objective function by comparing a plurality of neural network generated images to the plurality of images; and
   after the calculating the objective function, generating a calibrated lithography model.

14. The method of claim 13, wherein each of the plurality of mask raster images for a given measurement site have different pixel resolutions.

15. The method of claim 13, further comprising: generating weighting matrices for each image of the plurality of images.

16. The method of claim 13, wherein the neural network crops the aerial/resist image and the plurality of mask raster images in a region corresponding to a pixel that is being processed by the neural network.

17. A method of semiconductor device fabrication, comprising:
   training a neural network to output an ideal image, the training comprising:
     providing the ideal image, an aerial/resist image, and a plurality of mask raster images to the neural network, wherein the ideal image is a target output of the neural network, wherein the aerial/resist image and the plurality of mask raster images are inputs to the neural network, and wherein the ideal image includes simulated critical dimension (CD) data and simulated contour data that is substantially equal to corresponding CD measurement data and contour measurement data;
     based on the ideal image, the aerial/resist image, and the plurality of mask raster images, using the neural network to generate a simulated image;
     calculating an objective function by comparing the simulated image to the ideal image; and
     after the calculating the objective function, generating a final machine learning (ML)-assisted model image; and
   in response to the training the neural network, generating a calibrated lithography model.

18. The method of claim 17, further comprising:
using the calibrated lithography model to generate a modified mask layout pattern;
fabricating a mask based on the modified mask layout pattern; and
using the mask based on the modified mask layout pattern to pattern a wafer.

19. The method of claim 17, wherein the aerial/resist image and each of the plurality of mask raster images are neurons within an input layer of the neural network.

20. The method of claim 17, wherein the neural network includes more than one fully connected layer.

* * * * *